May 17, 1966 P. H. ACLOQUE 3,251,670
DIFFERENTIAL THERMAL TREATMENT OF GLASS OBJECTS
Filed Aug. 24, 1962 2 Sheets-Sheet 1
FIG. 1  FIG. 2  FIG. 3  FIG. 4
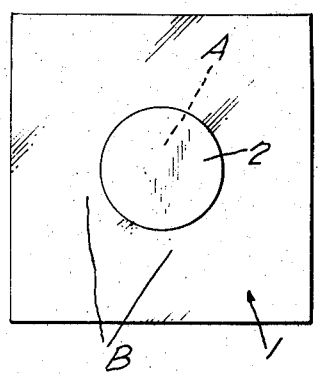  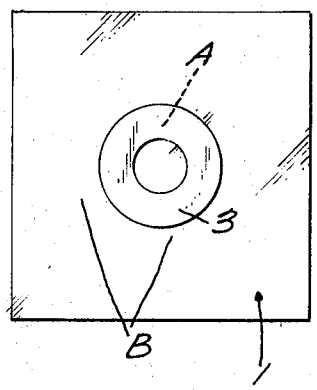 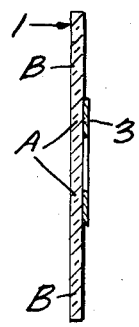
FIG. 6  FIG. 8
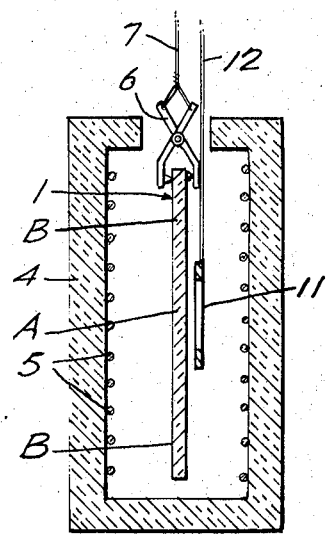 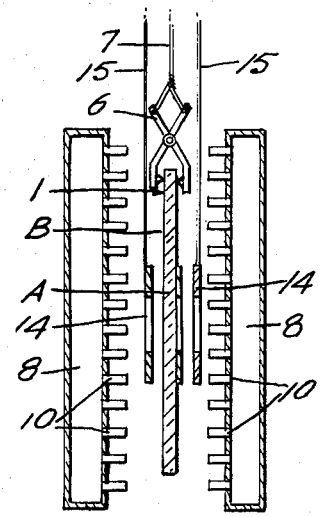
INVENTOR
PAUL HENRI ACLOQUE
ATTORNEY

INVENTOR
PAUL HENRI ACLOQUE

BY *Albert L. Frey*

ATTORNEY

United States Patent Office

3,251,670
Patented May 17, 1966

3,251,670
DIFFERENTIAL THERMAL TREATMENT OF GLASS OBJECTS
Paul Henri Acloque, Paris, France, assignor to Compagnie de Saint-Gobain, Neuilly-sur-Seine, Seine, France, a corporation of France
Filed Aug. 24, 1962, Ser. No. 219,339
Claims priority, application France, Oct. 25, 1954, 678,471; Jan. 26, 1955, 684,345
The portion of the term of the patent subsequent to Sept. 22, 1981, has been disclaimed
11 Claims. (Cl. 65—115)

This application is a continuation-in-part of my application Serial No. 542,109, filed October 21, 1955, now abandoned.

The present invention relates to the improvement of differentiated heat treatment processes of glass products, in particular glass sheets, plates or similar articles.

It is a known fact that one type of operation consists in subjecting the whole glass product to a heat treatment, for example, tempering which involves heating and rapid cooling, while by differentiating the treatment of certain areas of the sheet by various means, particularly, by protecting these areas by screens placed at some distance, or by giving them an adhesive coating, or also by subjecting them specially to the action of heating or cooling devices acting, for example, by radiation. When so used, the elements of differentiation of the heat treatment up to now, have been placed symmetrically with respect to opposite faces of the glass sheet.

The applicant has been able to establish that, in the execution of the differential heat treatment of sheets, plates or slabs of glass, and principally in the operations of the most diversified tempering processes, a unilateral element of differentiation could be substituted advantageously for the earlier used bilateral element.

The principal characteristic of the invention consists therefore in acting on the areas of the sheet to be subjected to differential heat treatment by means of unilateral elements, that is to say, arranged on only one side of the area to be differentiated. Several embodiments for attaining this characteristic are illustrated in the accompanying drawing, wherein FIG. 1 is a side view of a sheet of glass illustrating a circular coating applied to one side of the sheet serving to shield a selected or reserved zone thereof;

FIG. 2 is a vertical section through FIG. 1;

FIG. 3 is a side view of a sheet of glass illustrating an annular coating applied to one side of the sheet serving to shield a selected or reserved zone thereof;

FIG. 4 is a vertical section through FIG. 3;

FIG. 6 is a view of the interior of a heating furnace similar to that of FIG. 5 showing the glass sheet therein and a screen spaced from one face of the glass sheet having a shape approximating the selected or reserved zone of the sheet;

FIG. 8 is a diagrammatic vertical section of the blow boxes used for rapidly chilling the sheet with the coating thereon, the glass sheet being shown between the blow boxes;

FIG. 10 is a diagrammatic vertical section of the blow boxes and a glass sheet between the same and the presence of a spaced screen at one side of the sheet during the rapid chilling of the sheet.

In FIG. 1, there is shown a sheet of glass 1 in which a selected zone or area A is to be encompassed by the surrounding zone or area B. A coating 2, FIGS. 1 and 2, shaped to approximate the selected zone is applied directly to one face of the glass sheet. In FIGS. 3 and 4, the coating is shown in the form of an annulus or ring 3.

Figure 5:
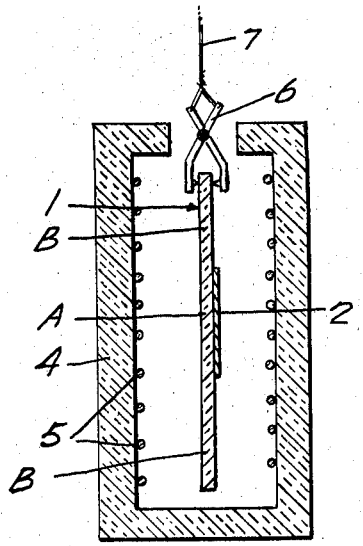
FIG. 5 is a diagrammatic view of the interior of an electric furnace for heating the glass sheet with the coating of FIGS. 2 or 4 to shield the selected or reserved zone of the sheet.

The coating having been applied to the glass sheet, it is delivered to the interior of an electric furnace 4 heated by the resistors 5 and suspended therein by the tongs 6 and cables 7, as shown in FIG. 5. The glass sheet in the furnace is heated to approximately its softening point whereupon it is removed from the furnace and delivered promptly to a position between oppositely placed blow boxes 8, provided with nozzles or openings 10 as shown in FIG. 8. A chilling medium, for example, air under pressure, enters each blow box from a suitable source (not shown) and is delivered from the nozzles 8 against the opposite sides of the glass sheet to rapidly chill the same.

In lieu of the coating applied directly to and in intimate contact with one side of the glass sheet, a plate or disc approximating the size and shape of the selected zone or area A and spaced from the face of the sheet may be employed. As shown in FIG. 6, a screen 11 is suspended by the cable 12 or otherwise maintained within the furnace and in spaced relation to the sheet. The glass sheet in the presence of the screen 11 is heated to approximately its softening point, after which it is promptly delivered to a position between the blow boxes 8 of FIG. 10. These blow boxes are similar to and function like the blow boxes of FIG. 8.

Figure 7:
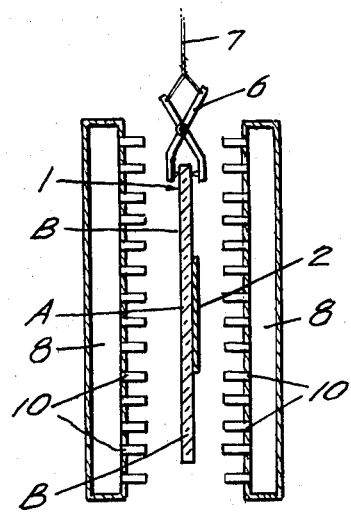
FIG. 7 is a view similar to FIG. 6, but showing a screen in the form of a fluid cooled ring spaced from one face of the sheet.

In FIG. 7 there is shown a hollow annular ring 13, suspended by the cable 12, which functions in a manner similar to the plate 11 of FIG. 6. The temperature of this ring may be regulated by the admission of fluid to the interior thereof. After the desired heating of the sheet, the sheet and the ring 11 are transferred to a position between the blow boxes for the rapid chilling operation. The fluid cooled ring is illustrative of many other positively heat-controlled unilateral elements which may be disposed adjacent to one side of the sheet during either its heating, its chilling, or both, to impose a desired differential thermal effect upon the reserved zone A relative to the environal zone B. The temperature of the fluid circulated through the hollow ring imposes a supplemental control of the shielding action executed thereby. An electric heating plate supplied with electric energy fed through electric wires supported with the suspension cable 12, affords another mode of such control.

Figure 9:
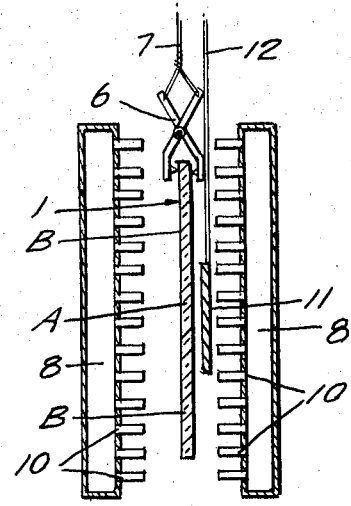
FIG. 9 is a diagrammatic vertical section of the blow boxes and the coated glass sheet between the same and the presence of spaced screens on opposite sides of the sheet during the chilling.

In FIG. 9, there is shown a coated glass sheet which has undergone heat treatment in the furnace 4 as shown in FIG. 5. When the sheet with its coating is transferred to a position between the blow boxes 8 of this figure for the rapid chilling operation, plates or discs 14, suspended by cables 15 may be located on opposite sides of the sheet and spaced therefrom to serve as screens during the chilling operation and as later explained in Example III.

Each of these elements may consist of a screen mounted at appropriate distance from the sheet 1, opposite to the area or selected zone A to be differentiated from the surrounding zone B or even placed in contact with it.

One may also use a coating substance 2, see FIGS. 1 to 4, such as paint or a protecting film applied to the said area or selected zone A, according to the procedure of the French patent filed December 30, 1954, for "Procedure for the Heat Treatment of Glass Products," corresponding to United States application Serial No. 542,108, filed October 21, 1955.

One may also utilize unilateral heating or cooling devices, these practical indications having moreover no limitative character. Such are generally described in connection with FIG. 7 above.

The use of unilateral differentiation elements according to the invention while letting one of the faces of the area to be differentiated under the influence of the heat treatment of the whole, makes it possible to introduce in this area of the sheet, intermediary heating conditions between those which prevail there in the absence of any differentiating element and those in which this area is subjected to a bilateral differentiating element, of the old type employed. The process according to the invention affords therefore the possibility of very accurate control of the thermal differentiation.

Following is a tabulation of test results performed upon identical specimens of glass sheets to determine the differences in effects of differential heat treatments when unilateral and bilateral shielding screens are employed in heating furnaces of the type illustrated in FIG. 6.

These tests were conducted upon sheets designated A and B, which were shielded upon one face of the sheet, while specimens C and D were provided with shielding screens adjacent to both surfaces of the sheets. The shielding screens in all cases consisted of composite discs having a diameter of 180 mm. composed of sheet iron of 2 mm. thickness and a juxtaposed layer of asbestos sheeting of 5 mm. thickness spaced a uniform distance from the glass surfaces. The tests were made in a heating furnace raised to a temperature of 725° C.

All four specimens remained in the heating furnace for the same time duration, namely, 3 minutes and 50 seconds, preparatory to chilling of the sheets.

| Test Specimen | Time of Insertion of Screens | Duration of Screening, seconds | Hooping Stress in kg./sq. cm. |
|---|---|---|---|
| A | 35 sec | 190 | 700 |
| B | 1 min | 165 | 500 |
| C | 2 min., 30 sec | 75 | 700 |
| D | 3 min., 15 sec | 30 | 500 |

The second column in the tabulation above sets forth the time of insertion of the unilateral or bilateral shielding screens after the introduction of the glass sheets into the furnace, and the screens were removed, in all cases, at the end of three minutes 45 seconds, or 5 seconds before the withdrawal of the sheets from the furnace. Thus, as shown in the third column, the screen of specimen A remained in shielding position for 3 minutes, 10 seconds and that of specimen B, 2 minutes, 45 seconds. On the other hand, the bilateral shields of specimens C remained in place 1 minute and 15 seconds, while those of specimen D remained in place for only 30 seconds.

The fourth column tabulates the values of the hooping stresses exterted by the surrounding tempered zone upon the reserved zone in the respective specimens.

By an examination of the figures in the fourth column above, it may be seen, by comparing specimens A and C, that the same hooping stress is attainable with a unilateral screen as with a bilateral screen. In the former case, the screen remained in place for a longer heating period and substantially at the start thereof. Thus, by a judicious selection of the screen and its properties, particularly its reflective power, thickness and shape, it is possible to attain a desired value of hooping stress. Also, the introduction of the unilateral screen at substantially the same time that the glass is placed into the furnace, presents a marked simplification in procedure.

It would be seen that the process of the present invention using a unilateral screen is much more flexible than that using bilateral screen. In fact one has to its disposal a screening duration very much greater with a unilateral screen than with a bilateral screen, said duration may be for example, as shown in the table, 190 seconds against 75 seconds in a first case or 165 seconds against 30 seconds in a second case. When the adjustment of the screening duration may be controlled in practice with a precision of ±5 seconds, it would be seen that this precision represents 2.6% of the total duration of the unilateral screening and 6% of the total duration of the corresponding bilateral screening in the first case, and in the second case 3% of the unilateral screening duration against 16% of the bilateral screening duration. Thus, with bilateral screens there is the risk to have a much greater irregularity in the manufactured products than with unilateral screening.

The process according to the invention makes it possible to reduce the number of differentiating elements by half, compared to the old processes which require elements on both sides of the sheet and the symmetry of the differentiation elements with respect to the sheet. Thus, a particularly advantageous simplification is obtained when the differentiation is achieved by giving the area to be differentiated, a coating such as paint.

Moreover, in the case of horizontal bending of a sheet of glass, of which certain areas are protected by a screen, it is diffcult to work with a double screen, since by subsiding, the sheet approaches the lower screen and is even likely to touch it, while it comes further apart from the upper screen. The use of a screen on one side only, according to the invention, prevents this difficulty and besides, makes it possible, if necessary, to construct a device for moving the screen in proportion to the sinking of the sheet such that, for example, the spacing of one another remains substantially constant.

Unilateral screens are particularly advantageous for the differential heat treatment of glass sheets to temper parts thereof differentially while bending them. Thus, a convex windshield may be formed by the settling of a horizontal plane sheet on a skeleton form. The sheet is tempered with a reserved zone of a lesser degree of temper, which may be particularly in the form of a band extending over the entire width of the sheet of glass. In case the sheet breaks, this band acts as a barrier to the propagation of fragmentation from a tempered zone on one side of the reserved band to the tempered zone on the other side of this band. Such a windshield may be produced as follows: The windshield is placed horizontally on a skeleton convex form, which may be in the form of a peripheral frame. At the moment of its entrance into the furnace, one band or two parallel bands of polished aluminum are placed on the upper surface of the windshield at the spot where the barrier of fragmentation is to be located. The temperature of the furnace is regulated so that the heating of the mass is progressive in the different zones which it occupies successively, since the convexity shaping form is carried by a carriage which is moved along the furnace.

At the time of chilling, the aluminum screen is expelled by air. The deformation resulting from putting the unilateral screen in place at the start of heating is minimal, and in any case, lower than the required tolerances, since all windshields conform to a model.

The applicant has found that the asymmetrical action, characteristic of the invention, does not affect the regularity or uniformity of the treated glass surface.

The results obtained by the process according to the invention are illustrated by way of the following examples which are not to be construed as limitations upon the invention.

*Example I.*—A glass plate of 40 x 40 x 0.6 cm. dimensions is coated on one side only by a disc of aluminum foil 3/100 mm. thick and 150 mm. in diameter, centered on the sheet and glued on with gum arabic, then suspended vertically and placed in the type of resistance furnace commonly used for tempering and heated to a mean temperature of 715° C. After 2 minutes, 45 seconds, the glass plate is taken out of the furnace and is immediately subjected to the blast between two boxes of the type commonly used for tempering. Lastly, the foil is removed from the sheet. This treatment produces a sheet of tempered glass with a circular zone compressed up to the interior at every point which is of very great resistance and may be perforated without giving rise to incipient breaking.

*Example II.*—A sheet of glass 40 x 40 x 0.6 cm. is given a coat of aluminum paint by spray gun. The composition is

| | Percent |
|---|---|
| Aluminum powder | 20 |
| Coumarone resins | 30 |
| White spirit | 50 | in such a way that a central area 70 mm. in diameter is covered, on one side only, with a very thin film, just thick enough to be opaque.

After the paint is dry the glass sheet is placed in the tempering furnace of Example I where it remains for 2 minutes and 55 seconds; then it is removed and subjected to the usual tempering blast. The paint is removed in lukewarm bath of caustic soda or washed in hydrochloric acid. The central area is the seat of a stressed state comprising an isotropic compression parallel to the faces, of 625 kg./cm.$^2$ intensity, and it presents the same resistance characteristics as the central area of Example I.

*Example III.*—A sheet of glass 40 x 40 x 0.6 cm. is covered by spray gun over a centered annular area of 180 x 120 mm. on one side only by an aluminum paint of the following composition.

| | Percent |
|---|---|
| Pelliculate aluminum paste | 19.3 |
| Coumarone resins | 15 |
| Xylene | 65.7 |

When the coating is dry the glass is placed in the tempering furnace of Example I, where it stays for 2 minutes 35 seconds. Then it is withdrawn and subjected, in non-coated areas, to the usual tempering blast, while the paint covered annular area is partially protected from the air blast by the annular sheet plate screens placed on both sides of the glass between these blast boxes and the glass, at 3.5 cm. away from the two sides of the glass, so that the screens are located just in front of the coated annular area.

In these conditions the annular area presents a state of stress comprising a circumferential compression of the order of 370 kg./cm.$^2$. In case of breakage of one of the adjacent tempered areas (islet inside the ring or area around this ring), the break stops at the ring and does not penetrate in the other area.

*Example IV.*—A 40 x 40 x 0.6 cm. sheet of glass is coated by spray gun over a central annular area of 180 x 120 mm. on one side only, with an aluminum paint of the same composition as in Example III.

When the paint is dry, the glass is put in the tempering furnace of Example I for 2 minutes and 30 seconds, then withdrawn and subjected to the homogeneous tempering blast.

In these conditions the annular area presents a state of stress comprising a circumferential compression of the order of 500 kg./cm.$^2$. If one of the adjacent tempered areas breaks (islet inside the ring or area around this ring) the break stops at the ring and does not enter another area.

*Example V.*—A 40 x 40 x 0.6 cm. sheet of glass is placed in the same tempering furnace as in the foregoing examples, and kept there for 1 minute, after which a cold, annular screen, of 180 and 120 mm. diameters, of 8 mm. thick sheet steel is placed between one of the faces of the sheet and one of the furnace heating walls, the space between screen and glass being 3.5 mm. This screen is kept in place for 2 minutes, then removed and the glass sheet subjected to the uniform tempering blast.

In these conditions the annular area presents a state of stress comprising a circumferential compression of about 750 kg./cm.$^2$. If one of the adjacent areas breaks (islet inside or area around this ring), the break stops at the ring and does not penetrate to the other area.

*Example VI.*—A 40 x 40 x 0.6 cm. sheet of glass is placed in the tempering furnace of Example I for 1 minute, after which a cold annular screen of 180 and 120 mm. diameters of 8 mm. thick sheet steel is placed between one of the faces of the glass sheet and one of the heating walls of the furnace, the spacing between screen and glass being 3.5 mm. This screen is kept in place before the glass, not only until it is withdrawn from the furnace, which is 3 minutes after its introduction in the furnace, but also during the tempering blast.

In these conditions the annular area presents a state of stress comprising a circumferential compression stress of about 650 kg./cm.$^2$. If one of the adjacent areas breaks (islet inside or area around this ring), the break stops at the ring and does not penetrate the other area.

The use of unilateral screens in the several examples above indicate certain advantages in these products over those which have been produced by conventional procedures with dual shielding screens. When bilateral screens are used to attain less tempered reserved zones in a sheet of glass, a certain surface irregularity appears in the form of small swellings in the vicinity of the parts protected by these screens. It has already been proposed, in order to avoid this disadvantage, to introduce the bilateral screen sufficiently late during heating, that is, substantially at the moment when the expansion of the glass is, for the most part, completed. In this way, it is possible to assure that the sheet of glass presents no perceptible swelling of the environal zone surrounding the reserved part.

Thus, when bilateral screens are used, it is necessary to determine with great precision the appropriate moment for placing the screen during heating, taking into account the value of stresses to be obtained finally in the different zones of the sheet of glass, the conditions of heating and the properties of the screens.

When using unilateral screens, the risks of deformation of the sheet of glass in the vicinity of the reserved zone is reduced as, though a surface deformation can still be produced on the face turned toward the screen, the deformation is greatly reduced on the opposite face where the thermal differentiation is not so sharp than on the face protected by the unilateral screen. It thus becomes possible to place the unilateral screen at the beginning of heating, which considerably simplifies the process of manufacture and the apparatus. This is evident by a comparison of the test specimens in the table above.

In the case of the heat reserve effected by means of a unilateral screen at the core or center of a circular reserved zone, the maximum deformation is of the order of $\frac{1}{10}$ of a mm. for an apparent hooping of 400 kg./cm.$^2$, that is, it is very slight.

With bilateral screens, the intervention of the screen at the start of heating can be done only by taking precautions to avoid breaking the glass at the start of heating, for example, by conducting the heating according to a slow enough progression. Consequently, painted screens that must be placed on the cold glass are difficult to use as bilateral screens. With unilateral screens, the risk of breakage by premature thermal shock at the start of heating is considerably reduced and it is thus possible to utilize pre-screened or pre-printed sheets of glass.

Moreover, in the case of bent sheets of glass, for windshields and the like, the irregularity of curvature which might result from a too great difference in temperature among the different parts of the sheet can likewise be reduced to a minimum with unilateral screens.

I claim:
1. In the method of thermally treating a glass sheet which includes the heating of the sheet to a temperature sufficiently high to effect tempering when followed by a sudden cooling thereof, the step of differentially heat-treating less intensely a selected zone of the sheet with respect to the portion of the sheet adjacent thereto by imposing the differential thermal treatment at said zone at one side only of said sheet.

2. The method of creating in a sheet of glass at least one zone less tempered than the remaining part of the sheet, which comprises heating the sheet at such a rate that said remaining part thereof reaches approximately its softening point while said zone is raised to a lower temperature by shielding one side only of said sheet at said zone during at least a part of the heating operation, and thereafter rapidly chilling the sheet.

3. The method set forth in claim 2 wherein the shielding of one side of the sheet is executed substantially for the entire duration of the heating operation.

4. The method set forth in claim 2 wherein the shielding of one side of the sheet is executed substantially for the entire duration of the heating and chilling operations.

5. The method of differentially tempering a glass sheet with respect to a selected zone thereof, which comprises shielding the selected zone on one side only of said sheet with a material capable of controlling the conditions of the heat exchanges between said selected zone and the exterior and spaced uniformly from said one side, heating the sheet on both sides thereof at such a rate as to raise the temperature of the unshielded portion of the sheet to approximately its softening point while the selected zone is raised to a lower temperature, removing the shield from the selected zone, and rapidly cooling uniformly both sides of the sheet.

6. The method of differentially tempering a glass sheet with respect to a selected zone thereof, which comprises shielding the selected zone on one side only of said sheet with a material capable of controlling the conditions of the heat exchanges between said selected zone and the exterior, heating the sheet on both sides thereof at such a rate as to raise the temperature of the unshielded portion of the sheet to approximately its softening point while the selected zone is raised to a lower temperature, and rapidly cooling the sheet uniformly on both sides thereof while the shield remains in place on one side of the sheet.

7. The method according to claim 6 wherein the shielding step is effected by spacedly mounting a sheet of metal in close proximity to and uniformly spaced from one side only of said sheet at said selected zone.

8. The method of differentially tempering a glass sheet with respect to a selected zone thereof, which comprises shielding the selected zone on one side only of said sheet with a material capable of controlling the conditions of the heat exchanges between said selected zone and the exterior and conforming to said selected zone and spaced uniformly adjacent to one side, heating the glass sheet so shielded on one side thereof at such a rate as to raise the temperature of the unshielded portion of the sheet to approximately its softening point while the selected zone is raised to a lower temperature, and rapidly cooling the sheet on both sides thereof.

9. The method as set forth in claim 8 wherein the selected zone remains shielded during the rapid cooling of the sheet.

10. The method of differentially tempering a glass sheet with respect to a selected zone thereof, which comprises shielding the selected zone on one side only of said sheet with a material capable of controlling the conditions of the heat exchanges between said selected zone and the exterior, heating the sheet on both sides thereof at such a rate as to raise the temperature of the unshielded portion of the sheet on both sides thereof to approximately its softening point while the selected zone is raised to a lower temperature, and rapidly cooling the sheet while shielding both sides of the sheet against the cooling effects at the selected zone.

11. The method of differentially tempering a glass sheet with respect to a selected zone thereof, which comprises initially heating the glass sheet on both sides thereof, shielding the selected zone on one side only of said sheet with a material capable of controlling the conditions of the heat exchanges between said selected zone and the exterior and conforming to said selected zone and spaced uniformly adjacent to one side, further heating the glass sheet so shielded on one side thereof at such a rate as to raise the temperature of the unshielded portion of the sheet to approximately its softening point while the selected zone is raised to a lower temperature, and rapidly cooling the sheet on both sides thereof.

References Cited by the Examiner

UNITED STATES PATENTS

| | | | |
|---|---|---|---|
| 1,454,200 | 5/1923 | Wells et al. | 65—61 |
| 2,244,715 | 6/1941 | Long | 65—115 X |
| 2,805,520 | 9/1957 | Black | 65—107 X |
| 2,910,807 | 11/1959 | Chan et al. | 65—115 X |
| 3,149,945 | 9/1964 | Bertrand et al. | 65—115 X |

DONALL H. SYLVESTER, *Primary Examiner.*